United States Patent [19]
Moore

[11] 4,261,198
[45] Apr. 14, 1981

[54] GEAR PROFILE CHECKING APPARATUS

[76] Inventor: James L. Moore, 115 N. Connecticut, Royal Oak, Mich. 48067

[21] Appl. No.: 44,468

[22] Filed: Jun. 1, 1979

[51] Int. Cl.³ .................................................. G01M 13/02
[52] U.S. Cl. .................................................. 73/162
[58] Field of Search ............... 33/179.5 C; 73/162; 74/397

[56] References Cited

U.S. PATENT DOCUMENTS

| | | | |
|---|---|---|---|
| 1,198,637 | 9/1916 | Kingsbury | 73/162 |
| 1,644,876 | 10/1927 | Domizi | 73/162 |
| 2,856,770 | 10/1958 | Palsson | 73/162 |
| 3,195,350 | 7/1965 | Reed | 73/162 |
| 3,657,940 | 4/1972 | Wagner | 74/397 |
| 3,774,313 | 11/1973 | Occhialini et al. | 73/162 X |
| 3,952,418 | 4/1976 | Akamatsu et al. | 73/162 X |

*Primary Examiner*—Jerry W. Myracle
*Attorney, Agent, or Firm*—Basile, Weintraub & Hanlon

[57] ABSTRACT

A gear train device for changing the angular relationship of an input gear relative to an output gear is disclosed. A pair of meshing gears to be checked are attached to the input and output gears to rotate therewith. By changing the angular relationship between the input gear and the output gear while the gear train is rotating, the gears to be checked are caused to contact the mating gear along a first tooth face while the angular relationship between the input gear and the output gear is urged in a first direction, and then the gears are caused to mesh along a second face when the output shaft is caused to move in an angular relationship to the input shaft in a second direction. By coating one of the gears to be checked with a material easily removed by rubbing, the gear profiles can be checked by measuring the amount of coating transfer between gears.

8 Claims, 9 Drawing Figures

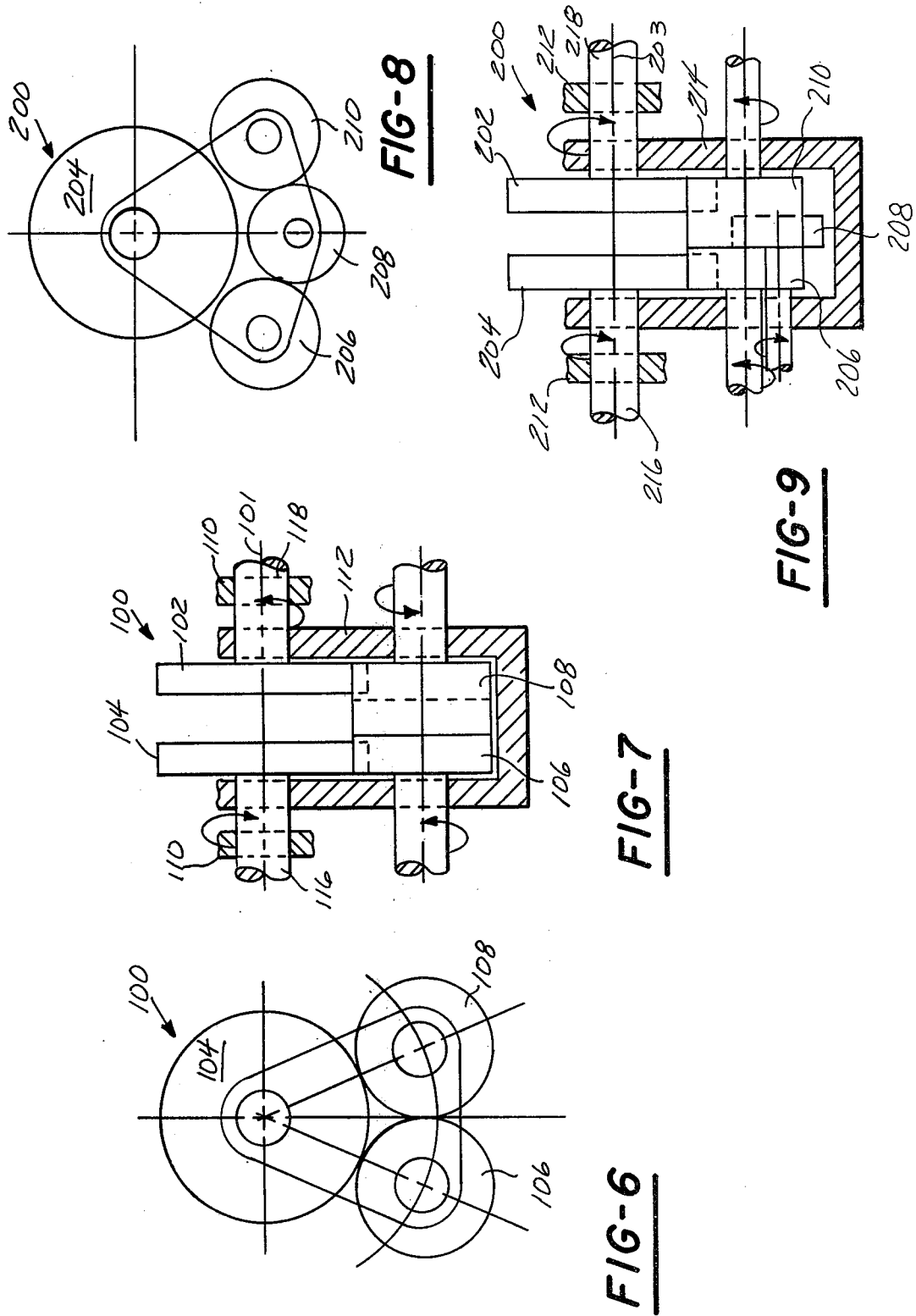

GEAR PROFILE CHECKING APPARATUS

BACKGROUND OF THE INVENTION

I. Field of the Invention

The present invention relates to the field of gear profile checking devices, and more particularly to the field of gear profile checking devices which measure the contact between meshing gears. Even more particularly, the present invention relates to the field of gear profile checking devices which check the degree of contact between both faces of mating gears while the gears are rotating in a single direction.

II. Description of the Prior Art

Devices for checking the profile of gears have long been known. U.S. Pat. Nos. 1,198,637; 2,856,770; 3,774,313; and 3,952,418 are illustrative of the various types of devices used in the past to check gears. U.S. Pat. No. 1,198,637 discloses a device for angularly displacing one set of gears against another thereby inducing a tooth load between gear sets that is comparable to the load imposed between the gears when in normal operation. By displacing the gears one against another in a first direction a load pattern is imposed along one face of the gears to be checked. By angularly displacing the gear sets one to another in a second direction, the gears are loaded one against another along a second face of the gear teeth. By running the gear teeth for a period of time loaded first against one set of tooth faces and then for a period of time against the other set of tooth faces, inspection of the wear pattern between the faces of the gear teeth indicates whether a satisfactory tooth form has been established on the gear teeth. The testing is accomplished without employing the greater horse power and cost required to load the teeth by applying an input power to the shaft and absorbing the output power with a dynamometer. However the rotation must be stopped and the phase relationship between gears reversed to check the opposite gear tooth face.

U.S. Pat. No. 2,856,770 discloses an electromechanical apparatus for measuring the play or angular backlash in a transmission.

U.S. Pat. No. 3,774,313 discloses an apparatus for checking gear teeth profiles by measuring the radial movement of a plurality of master gears running in mesh with the gear to be checked. The master gears are loaded radially against the gear to be checked and have radially floating centers. By comparing the radial movement of the master gears center relative to each other, indication of the accuracy of the gear tooth profile is obtained. A flaw or indentation along the face of the gear can be detected by this device.

U.S. Pat. No. 3,952,418 discloses a master gear for checking tooth contact. The master gear has a plurality of electrical conducting surfaces along the contact area. Electrical potential is measured between the gear to be tested and the conducting surfaces to indicate the degree of contact between teeth.

None of the above listed patents disclose the features of the present invention which allow an angular relationship to be changed between rotating gears so that contact can be established on both faces of the gears without reversing rotation.

Differential gear sets such as those employed in the rear axle of automobiles have long been known. The present invention differs from conventional rear axle differentials in that all gears in the present invention rotate in a common plane or parallel planes.

SUMMARY OF THE INVENTION

The present invention comprises a gear train device for changing the angular relationship of an input gear relative to an output gear while rotating in either direction. The device comprises an input gear meshing with a first idler gear; a second idler gear meshing with the first idler gear; and an output gear meshing with the second idler gear with all gears rotating in a common plane or parallel planes.

A first base means rotatably supports the idler gears. A second base means rotatably supports the input gear and the output gear. A pair of radius arms are employed to hold a constant center distance between the input gear and the first idler gear, and between the second idler gear and the output gear.

Movement of the second base member relative to the first base member in a first direction causes an angular displacement of the output gear relative to the input gear in a first angular direction. Movement of the second base member relative to the first base member in a second direction causes an angular displacement of the output gear relative to the input gear in a second angular direction.

A pair of meshing gears to be checked are attached to the input and output gears and configured to rotate therewith. Movement of the second base member relative to the first base member in a first direction causes relative angular movement of the gears to be checked in a first angular direction inducing contact between the teeth of the gears to be checked along a first tooth face. Movement of the second base member relative to the first base member in a second direction causes relative angular movement of the gears to be checked in a second angular direction causing contact between teeth of the gears to be checked along a second face.

A means for measuring the extent of contact between gears along their faces comprises the coating of one of said gears with a material easily removed by rubbing and measuring the amount of coating transferred between gears as they are rotated.

For a more complete understanding of the present invention reference is made to the following detailed description of the various embodiments of the present invention and the detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein:

FIG. 6 illustrates a gear train with the input gear and the output gears disposed along a common axis and rotating in opposite directions wherein angular displacement of the centers of the idler gears relative to the input gear causes an angular displacement of the output gear;

FIG. 7 illustrates a side view of the device of FIG. 6;

FIG. 8 illustrates a gear train with the input and output gear disposed along a common axis and rotating in a common direction wherein angular displacement of the centers of the idler gears relative to the input gear causes an angular displacement of the output gear; and FIG. 9 illustrates a side view of the device of FIG. 8

DESCRIPTION OF THE PREFERRED EMBODIMENT

Figure 1:
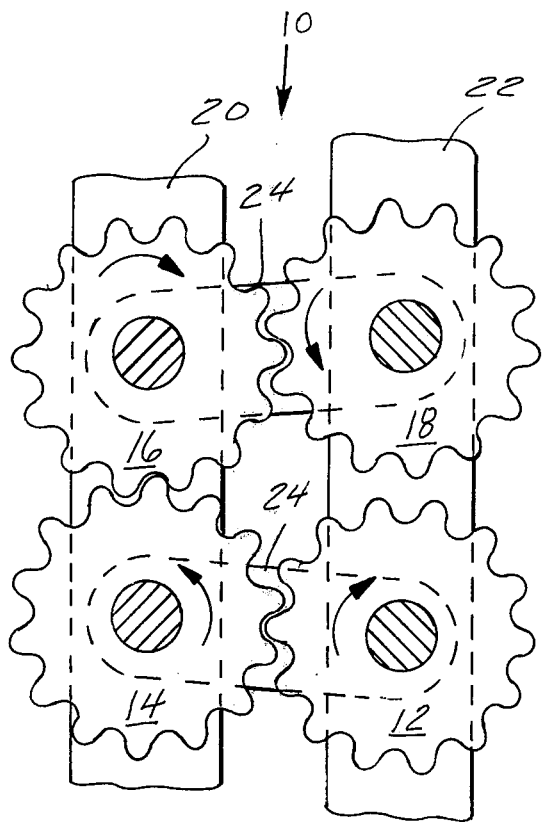
FIG. 1 illustrates a diagramatic top view of the gear train employed in the present invention.

Referring now to the drawings and in particular to FIGS. 1 through 5 wherein there is illustrated at 10 a preferred embodiment of the present invention. The preferred embodiment illustrated at 10 comprises an input gear 12 meshed with a first idler gear 14 which meshes with a second idler gear 16. The second idler gear 16 meshes with the output gear 18. A first base means 20 rotatably supports the idler gears 14 and 16 in a spaced apart meshing relationship. A second base means 22 rotatably supports the input gear 12 and the output gear 18 in a spaced apart relationship so that the gears do not clash. A pair of radius arms 24 hold a constant center distance between the input gear 12 and the first idler gear 14 and between the second idler gear 16 and the output gear 18.

Figure 2:
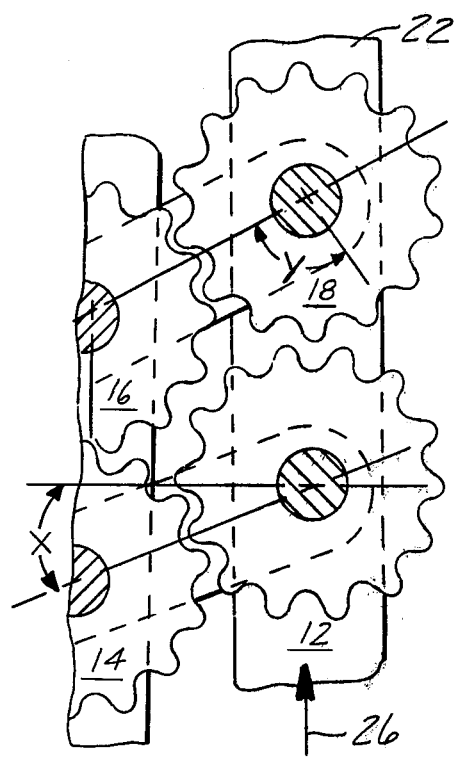
FIG. 2 illustrates a top view of the gear train in FIG. 1 with the centers of the first idler gear and second idler gear displaced angularly in a first direction from their position in FIG. 1.

Referring now to FIG. 2, a lateral displacement of the second base member 22 in the direction shown by an arrow 26 causes an angular displacment X of the center of the first idler gear 14 with respect to the center of the input gear 12. The angular displacement X causes an angular movement Y of the output gear 18 relative to the input gear 12.

Figure 3:
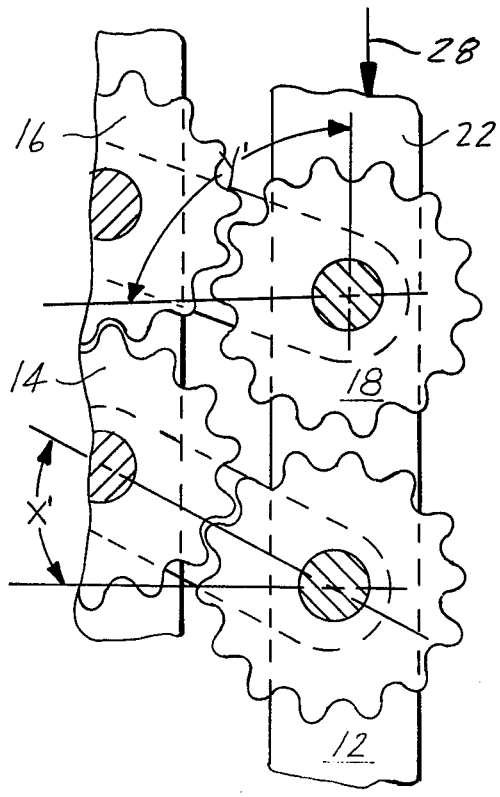
FIG. 3 illustrates the gear train of FIG. 1 with the centers of the first idler gear and second idler gear displaced angularly from their position in FIG. 1 in a second direction.

Referring now to FIG. 3 wherein the device of FIG. 1 has the member 22 displaced in the direction of an arrow 28 causing an angular displacement of the center of the first idler gear 14 relative to the center of the input gear 12 as denoted by the angle X'. The angular displacement X' induces an angular displacement Y' of the output gear 18. A displacement of the member 22 from its position shown in FIG. 2 to its position shown in FIG. 3 produces an angular displacement of the center of the first idler gear 14 from the axis of the input gear 12 represented by the angular sum of the angles X' plus X which produces an angular rotation of the output gear 18 relative to the input gear 12 of Y' plus Y while rotating in either direction.

From the foregoing it is observed that an angular displacement of the first idler gear 14 with respect to the input gear 12 in a first direction produces an angular displacement of the output gear 18 relative to the input gear 12 in a first direction. A displacement of the first idler gear 14 relative to the input gear 12 in a second direction produces an angular displacement of the output gear 18 relative to the input gear 12 in a second angular direction.

Figure 4:
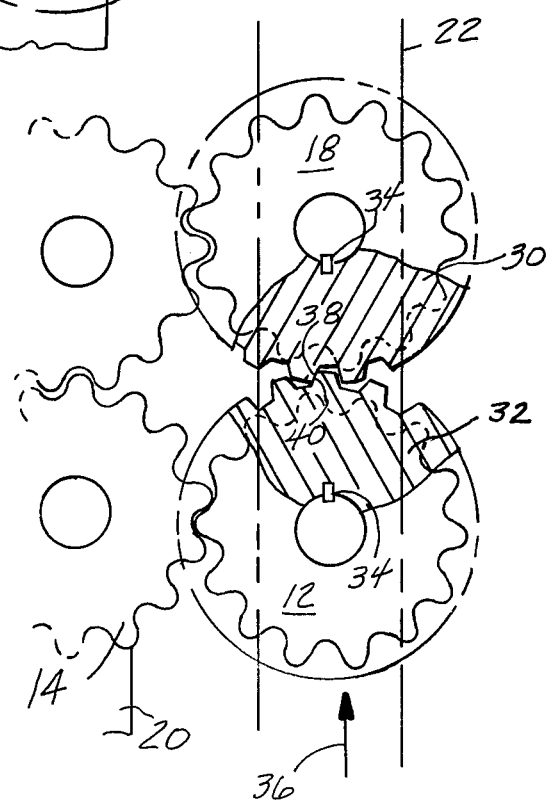
FIG. 4 illustrates the gear train of FIG. 1 with a pair of meshing gears to be checked attached to the input gears and the output gears respectively and the centers of the idler gears displaced in the first direction.

The spacing between the input gear 12 and the output gear 18 along the member 22 is selected to match the spacing required for a pair of gears 30 and 32 to be checked (FIG. 4). The gears 30 and 32 are affixed to the output gear 18 and the input gear 12 respectively and are keyed to rotate therewith by a pair of keys 34. The back lash between the gear 30 and the gear 32 indicates that very little angular displacement of the input gear 12 relative to the output gear 18 is possible. Urging of the member 22 in a direction indicated by an arrow 36 induces an angular displacement of the output gear 18 relative to the input gear 12 causing the gears 30 and 32 to contact along the faces 38 and 40 respectively (FIG. 4). The force exerted along the direction of the arrow 36 in FIG. 4 determines the force exerted between the faces 38, 40.

Figure 5:
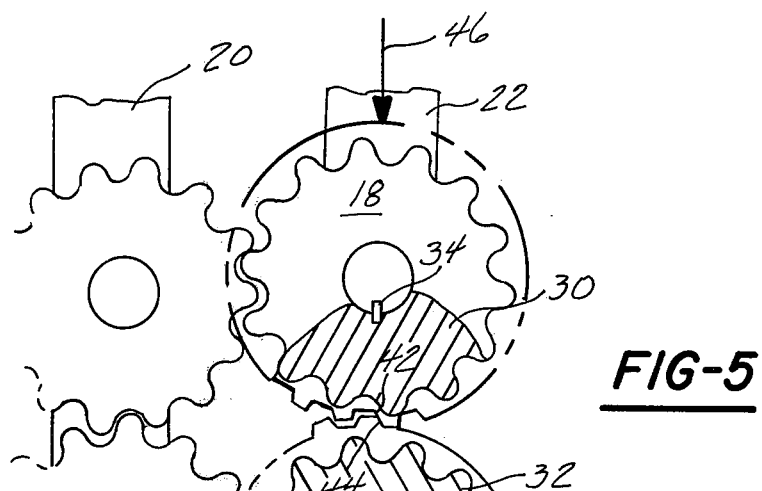
FIG. 5 illustrates the device of FIG. 4 with the idler gears displaced in a second direction.

Referring now to FIG. 5, urging the member 22 in a direction indicated by an arrow 46, induces an angular displacement of the center of the first idler gear 14 in a second angular direction inducing an angular displacement of the output gear 18 relative to the input gear 12 in a second direction and causing the gear 30 and the gear 32 to contact along the tooth faces 42 and 44 respectively.

The ratio between gears to be checked can be any desired ratio provided that the ratio between the input gear 12 and the output gear 18 is the same ratio.

As will be understood by the skilled artisan, if one of the gears 30 and 32 is first coated with a material easily removed by rubbing and the gears are assembled as illustrated in FIG. 4 or 5 for rotation with the input gear 12 and the output gear 18, respectively, a rotation of the input gear 12 while the number 22 is urged in the direction illustrated by the arrow 36 in FIG. 4, produces a transfer of the coating material from one gear to another along the faces 38 and 40 and indicates where contact is established between the gear faces. Rotation of the input gear 12 while urging the member 22 in the direction indicated by the arrow 46 in FIG. 5 will induce contact between the gears 30 and 32 along the faces 42 and 44. A transfer of the coating material between the faces will indicate where contact along the faces 42 and 44 has been established. Thus a careful check of the areas where contact between the mating gear teeth is established.

To operate the device disclosed hereinabove, all that is necessary is to coat one of the gears with a material easily removed by rubbing and rotate the input gear 12 in a single direction. While rotating the input gear 12 the member 22 is urged in the first direction and then in the second direction which establishes contact between both faces of one of the gears to be checked with the adjacent faces of the other gear to be checked. It is obvious to those skilled in the art of gear inspection that one of the gears 30 and 32 can be a master gear which is then used to check the profile of the mating gear.

Referring again to the drawings, and in particular FIGS. 6 and 7, there is illustrated at 100 a device for changing an angular displacement of an output gear 102 with respect to an input gear 104. The output gear 102 and the input gear 104 are aligned but spaced apart a distance along a common center line or axis 101. The input gear 104 drives and is meshed with a first idler gear 106. The first idler gear 106 is meshed with and drives a second idler gear 108. The second idler gear 108 meshes with and drives the output gear 102 on the center line 101. The input gear 104 and the output gear 102 are supported along the common axis 101 by a first support member 110. A second support member 112 is rotatably supported by an axle 116 projecting from the input gear 104 and an axle 118 projecting from the output gear 102. The second support member 112 rotatably supports the first idler gear 106 and the second idler gear 108. Rotation of the support member 112 about the axis 101 in a first direction causes the output gear 102 to rotate relative to the input gear 104 in a first direction. Rotation of the member 112 in a second direction about the axis 101 causes the output gear 102 to rotate relative to the input gear 104 in a second direction. It can be readily understood by the skilled artisan, that the device illustrated in FIGS. 6 and 7 can be readily used for rotating an output shaft relative to an input shaft while both shafts are rotating in opposite directions to align the angular displacement of the output shaft relative to the input shaft. Such a device may be employed in multi-color rotary presses to align and register the colors in a multi-color printed picture.

Referring now to the drawings, and in particular to FIGS. 8 and 9 there is illustrated at 200 a device employing an input gear 204 and an output gear 202 aligned with but spaced from the input gear 204. The input gear 204 is meshed with and drives a first idler gear 206. The first idler gear 206 meshes with and drives a second idler gear 208 which meshes with and drives a third idler gear 210. The third idler gear 210 meshes with and drives the output gear 202 in the same direction as the input gear 204. The input gear 204 has an axle 216 projecting therefrom which is rotatably supported by a first support member 212. The output gear 202 has an axle 218 projecting therefrom which is rotatably supported by the first support member 212 in axial alignment with the input gear 204 along an axis 203. A second support member 214 is rotatably supported by the axle 216 and the axle 218. The second support member 214 rotatably supports the first, second, and third idler gears 206, 208 and 210, respectively.

Axially rotating the second support member 214 relative to the input gear 204 in a first direction along the axis 203 causes the output gear 202 to rotate relative to the input gear 204 in a first direction. Rotation of the second support member 214 in a second direction relative to the input gear 204 causes the output gear 202 to rotate in a second direction relative to the input gear 204.

It is readily understood by the skilled artisan that the device illustrated in FIGS. 8 and 9 can be employed to advance or retard an output gear 202 relative to the input gear 204 as the gears are rotating by rotating the second support member 214 relative to the input gear 204 in a first or second direction.

It is also readily understood by the skilled artisan that a device as illustrated in FIGS. 8 and 9 can be employed in any application requiring a device to advance or retard the relative position of an input gear relative to an output gear while the gears are rotating. The device illustrated in FIGS. 8 and 9 can be readily employed in a rotary multi-color printing press to bring the colors in proper registry while the press is in operation.

Having thus described my invention what I claim is:

1. A gear train device for changing the angular relationship of an input gear relative to an output gear comprising:
    an input gear meshing with a first idler gear;
    an output gear;
    a second idler gear meshed with the first idler gear and the output gear;
    said output gear axially aligned with and spaced from the input gear by a first base member, and rotating in a direction counter to the input gear;
    a second base member for rotationally supporting the first and second idler gears holding their centers; and
    whereby rotation of the base member in a first angular direction relative to the input gear about the input and output gear axis causes a first angular displacement of the output gear relative to the input gear, and rotation of the base member in a second direction causes an angular displacement of the output gear relative to the input gear in a second direction.

2. The gear train device as defined in claim 1 further comprising:
    a pair of radius arms to hold a constant center distance between the input gear and the first idler gear, and between the second idler gear and the output gear; and
    whereby movement of the second base member relative to the first base member in a first direction causes an angular displacement of the output gear relative to the input gear in a first angular direction, and movement of the second base member relative to the first base member in a second direction causes an angular displacement of the output gear relative to the input gear in a second angular direction.

3. The gear profile checking apparatus as defined in claim 2 adapted to checking the tooth profile of a pair of meshing gears further comprising:
    the pair of meshing gears to be checked attached to the input and output gears to rotate therewith;
    whereby movement of the second base member relative to the first base member in a first direction causes relative angular movement of the gears to be checked in a first angular direction inducing contact between teeth of the gears to be checked along a first tooth face, and movement of the second base member relative to the first base member in a second direction causes relative angular movement of the gears to be checked in a second angular direction causing contact between teeth of the gears to be checked along a second face; and
    means for measuring the extent of contact between gears to be checked.

4. The gear profile checking apparatus as defined in claim 3 wherein the means for measuring the extent of contact between gears comprises coating one of said gears to be checked with a material easily removed by rubbing and measuring the amount of coating transferred between gears.

5. The apparatus of claim 3 wherein the ratio between the input and output gears and the gears to be checked is 1 to 1.

6. The apparatus of claim 3 wherein the ratio between the gears to be checked is any suitable ratio provided the gears to be checked and the input and output gears have the same ratio.

7. The apparatus as defined in claim 3 wherein one of said gears to be checked is a master gear.

8. A gear train device for changing the angular relationship of an input gear relative to an output gear comprising:
    an input gear meshing with a first idler gear;
    an output gear;
    a second idler gear meshed with the first idler gear;

a third idler gear meshed with the second idler gear and the output gear;
a first base member for supporting the input gear and the output gear, said gears axially aligned and spaced apart and rotating in a common direction;
a second base member for rotationally supporting the first, second, and third idler gears holding their centers in a fixed relationship; and whereby rotation of the second base member in a first angular direction relative to the input gear causes a first angular displacement of the output gear relative to the input gear, and rotation of the second base member in a second direction relative to the input gear causes an angular displacement of the output gear relative to the input gear in a second direction.

* * * * *